(12) United States Patent
Dorenbosch et al.

(10) Patent No.: US 7,190,956 B2
(45) Date of Patent: Mar. 13, 2007

(54) INSTANT MESSAGE PROXY FOR CIRCUIT SWITCHED MOBILE ENVIRONMENT

(75) Inventors: Jheroen P Dorenbosch, Paradise, TX (US); Kevin C Mowry, Irving, TX (US)

(73) Assignee: Motorola Inc., Schaumburg, IL (US)

( * ) Notice: Subject to any disclaimer, the term of this patent is extended or adjusted under 35 U.S.C. 154(b) by 196 days.

(21) Appl. No.: 09/855,385

(22) Filed: May 15, 2001

(65) Prior Publication Data
US 2002/0173308 A1  Nov. 21, 2002

(51) Int. Cl.
*H04Q 7/20* (2006.01)
*G06F 15/16* (2006.01)

(52) U.S. Cl. ............... 455/435; 709/205; 709/206

(58) Field of Classification Search ........... 455/466, 455/517, 426, 414, 412, 458, 415, 405, 5.19, 455/422, 444, 425, 67.7, 407, 67.1, 331, 455/83, 89, 33.1, 432.2, 421, 414.4, 416, 455/432.3, 3.01, 418, 412.1, 435, 445, 552, 455/507, 509, 553, 414.1, 412.2; 709/204, 709/206, 205; 340/825.2, 825.44, 825.47, 340/7.22, 7.23; 370/429
See application file for complete search history.

(56) References Cited

U.S. PATENT DOCUMENTS

| | | | | |
|---|---|---|---|---|
| 5,802,466 A | * | 9/1998 | Gallant et al. | 455/413 |
| 5,903,726 A | * | 5/1999 | Donovan et al. | 395/200.36 |
| 5,940,756 A | * | 8/1999 | Sibecas et al. | 455/426.1 |
| 5,960,074 A | * | 9/1999 | Clark | 379/310 |
| 6,014,429 A | * | 1/2000 | Laporta et al. | 379/88.15 |
| 6,091,710 A | * | 7/2000 | Mawhinney | 370/236 |
| 6,301,609 B1 | * | 10/2001 | Aravamudan et al. | 709/207 |
| 6,333,929 B1 | * | 12/2001 | Drottar et al. | 370/362 |
| 6,430,604 B1 | * | 8/2002 | Ogle et al. | 709/207 |
| 6,463,463 B1 | * | 10/2002 | Godfrey et al. | 709/206 |
| 6,512,930 B2 | * | 1/2003 | Sandegren | 455/518 |
| 6,760,580 B2 | * | 7/2004 | Robinson et al. | 455/412.2 |
| 2002/0034281 A1 | * | 3/2002 | Isaacs et al. | 379/88.12 |
| 2002/0077077 A1 | * | 6/2002 | Rezvani et al. | 455/410 |
| 2002/0102967 A1 | * | 8/2002 | Change et al. | 455/414 |
| 2002/0147988 A1 | * | 10/2002 | Nakano | 725/134 |
| 2002/0155826 A1 | * | 10/2002 | Robinson et al. | 455/412 |

\* cited by examiner

*Primary Examiner*—Melody Mehrpour
(74) *Attorney, Agent, or Firm*—Hisashi D. Watanabe

(57) ABSTRACT

An instant message (IM) proxy according to the present invention is capable of maintaining the availability status of a mobile subscriber even when the mobile subscriber is roaming or temporarily out of a mobile network coverage area, and even after the IM proxy unsuccessfully attempts to send an instant message to the mobile subscriber. Messages will continue to be re-sent to the mobile subscriber in the near-real time manner characteristic of a typical instant message system until IM parameters programmed into a retry counter and/or the timer located at the proxy are exceeded and the IM proxy drops the message. In addition, the IM proxy of the present invention is capable of bundling instant messages intended for the mobile subscriber to minimize mobile system overhead connection costs while at the same time minimizing IM system latency.

11 Claims, 7 Drawing Sheets

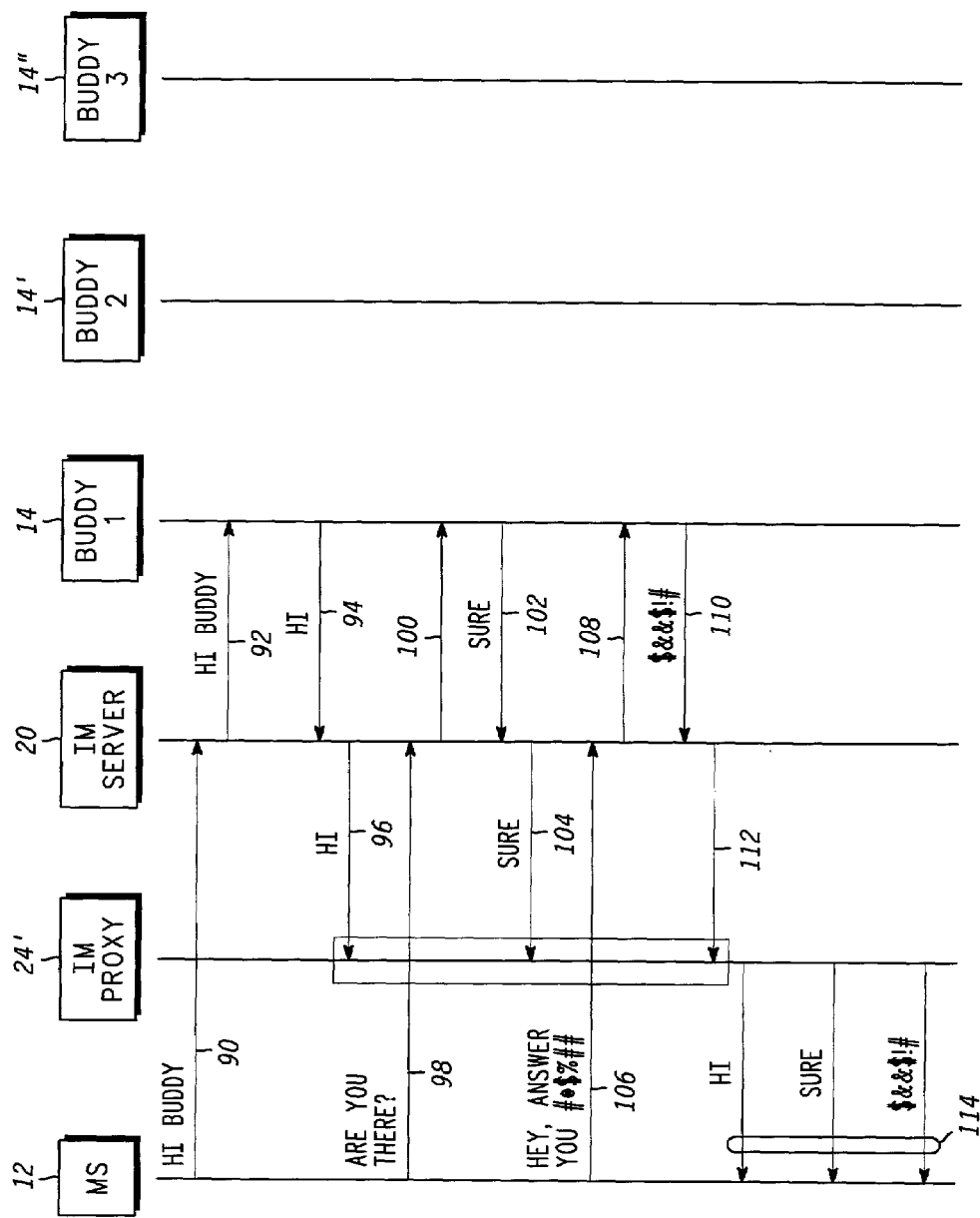

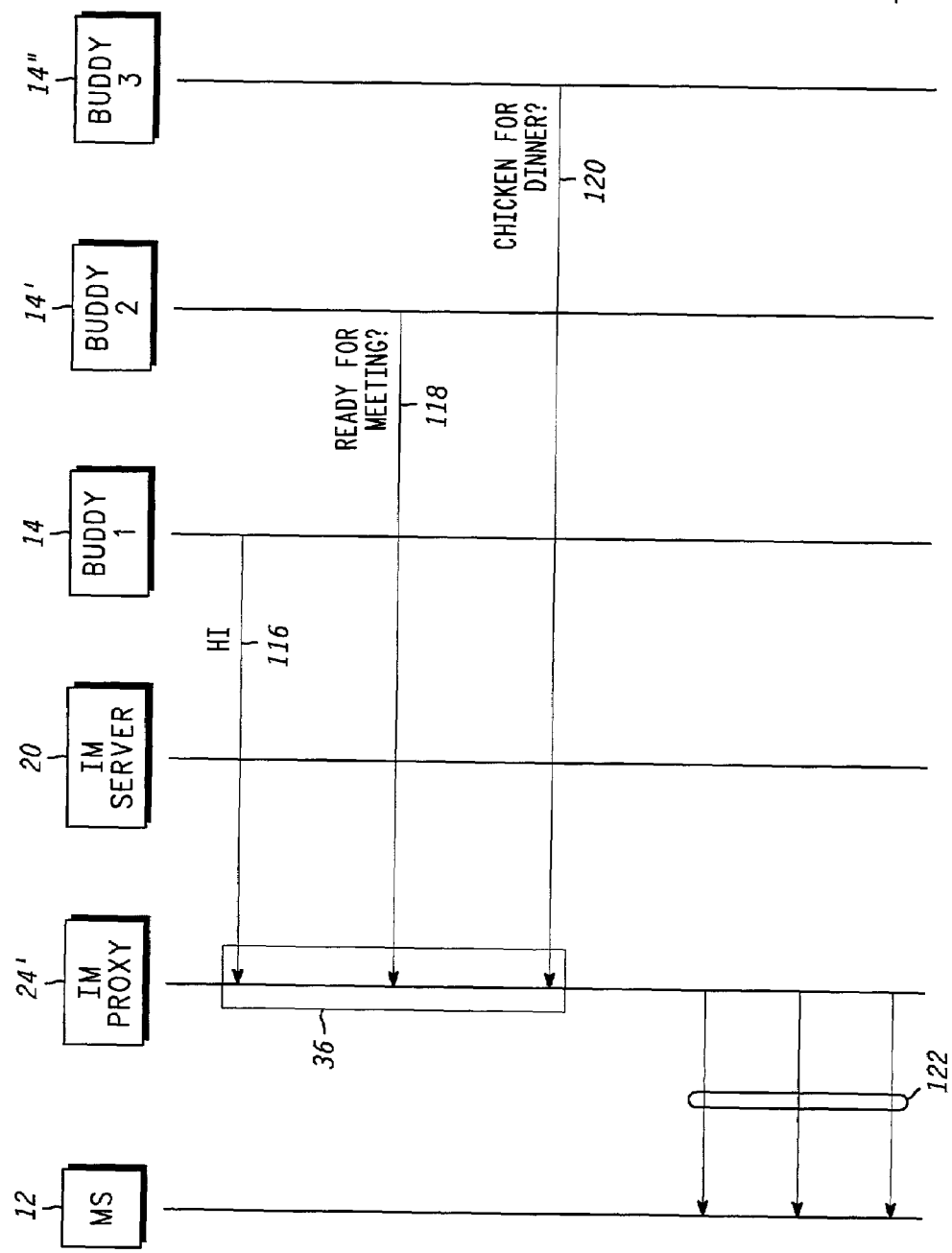

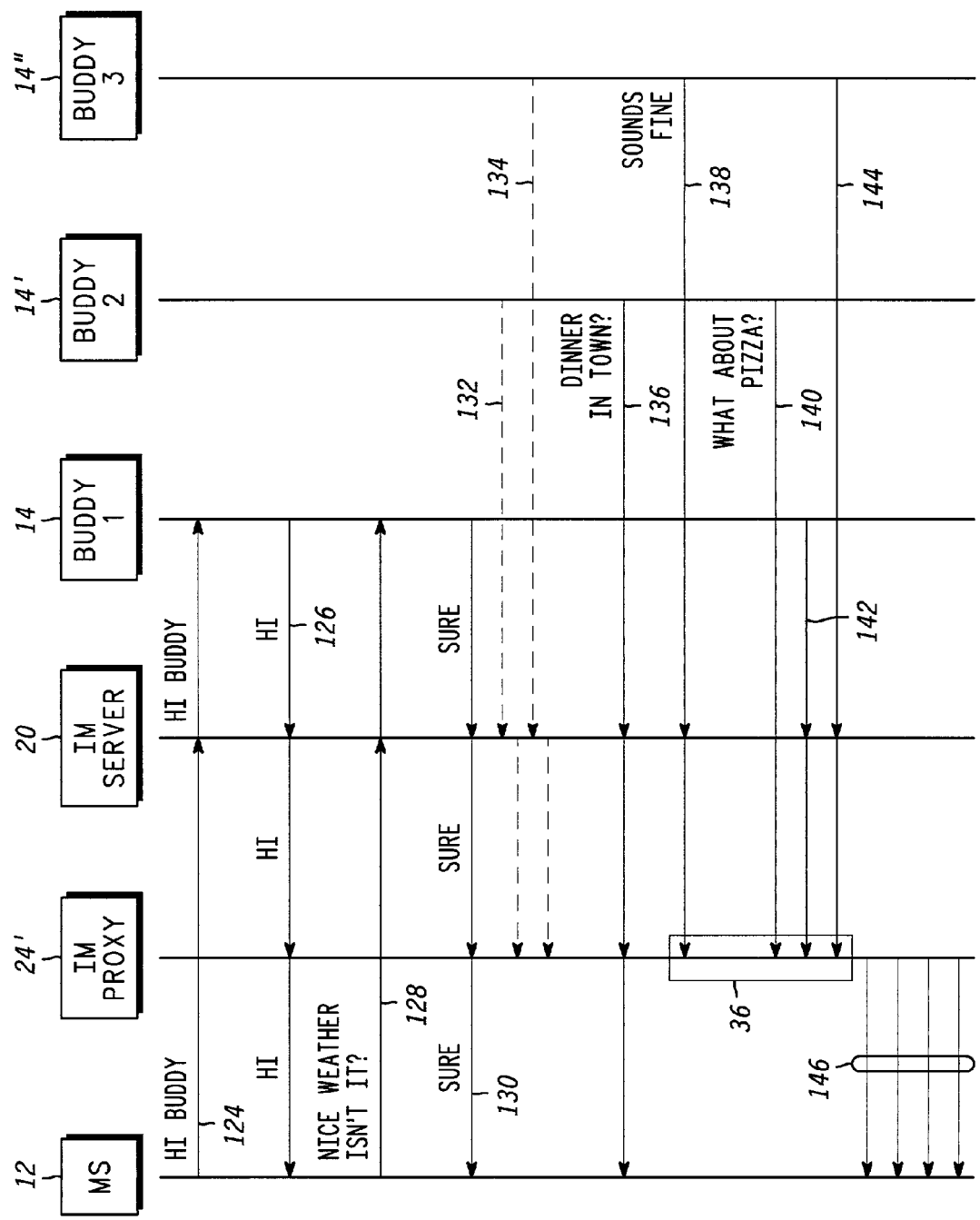

INSTANT MESSAGE PROXY FOR CIRCUIT SWITCHED MOBILE ENVIRONMENT

BACKGROUND OF THE INVENTION

1. Field of the Invention

The present invention relates generally to instant message systems, and more particularly to an instant message proxy that is capable of maintaining the availability status of a mobile subscriber when the communicating to the subscriber is temporarily broken.

2. Background of the Invention

Conventional instant message (IM) systems use a variety of system architectures. However, such systems typically require that potential IM participants, often referred to as buddies, must register and establish a connection with an IM login server. Participant-specific information, such as presence contact information, is generated through this registration and is stored in a database associated with the IM login server for the duration of the IM session. Additionally, the IM login server uses the connection to determine the presence status of the buddy; if the connection is broken, the buddy is unavailable. Once IM participants are registered with the IM login server, messages sent between registered participants are typically routed through an IM message server or servers to the respective designated target buddy or buddies.

The above-described conventional IM systems have certain associated limitations when one or more of the participants in an IM session communicate via an IM-enabled mobile station such as a mobile handset. Specifically, IM systems typically rely on a best-effort delivery mechanism in which a message intended for a target buddy is delivered if the IM login server determines that the target buddy is available. If the IM login server determines that the target buddy is not available, the message is dropped. Because a mobile station participant may move in and out of service during an IM session, it may not be possible for the mobile station to maintain a reliable connection with the login server. If the connection is lost, messages targeted at the mobile station will be inadvertently dropped.

In addition, a circuit-switched mobile network has both a considerable delay associated with an IM connection set-up and a high cost associated with maintaining an open connection during an IM session. Therefore, it is not economically practical to implement an IM system with mobile network subscribers by establishing and then maintaining open connections for the duration of IM sessions.

BRIEF DESCRIPTION OF THE DRAWINGS

Additional objects and advantages of the present invention will be more readily apparent from the following detailed description of preferred embodiments thereof when taken together with the accompanying drawings in which:

FIG. 7 is a timing diagram illustrating message transmission protocol between the source and target buddies shown in FIG. 4 over an IM system of another preferred embodiment in accordance with the present invention;

FIG. 8 is a timing diagram illustrating IM proxy message buffering protocol; and FIG. 9 is a timing diagram further illustrating message transmission protocol between multiple source buddies and the target buddy of FIG. 4 over the IM system discussed in connection with FIGS. 7 and 8.

DETAILED DESCRIPTION OF THE PREFERRED EMBODIMENTS

Figure 1:
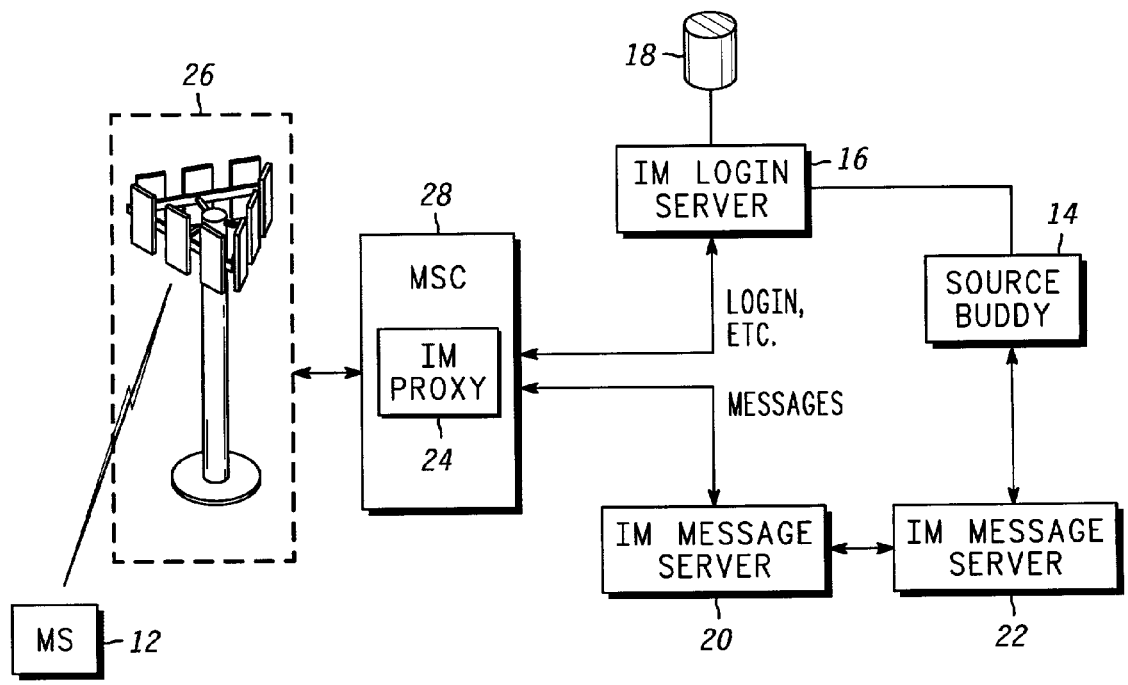
FIG. 1 is a system diagram of an IM system of a preferred embodiment in accordance with the present invention.

Referring now to the drawings in which like numerals reference like parts, FIG. 1 shows an architecture of an IM system 10 that accommodates both a mobile subscriber, represented generally by the wireless handset, 12, and a conventional subscriber, represented generally by a personal computer 14. While it should be understood that the system architecture is capable of supporting plural IM sessions among numerous mobile and/or conventional subscribers, only the single mobile subscriber 12 and the single conventional subscriber 14 are shown for discussion purposes.

The IM system 10 includes an IM login server 16. All IM system subscribers must register with the IM login server 16 to become available for and participate in an IM session. The IM login server 16 includes a login database 18 for storing subscriber information, such as presence information for informing subscriber buddies of the login presence of the subscriber, contact information indicating that a subscriber is available for receiving instant messages, and/or other similar subscriber-specific information and parameters that the IM login server 16 detects and receives based on subscriber registration. The IM system 10 may also include one or more IM message servers, such as the IM servers 20, 22, for facilitating passage of instant messages between subscribers who have registered with the IM login server 16 in a manner known to those skilled in the art.

In addition to the above components, the IM system 10 also includes an IM proxy 24 according to the present invention that is located in a message pathway between the mobile subscriber 12 and both the IM login server 16 and the IM message servers 20, 22. The IM proxy 24 functions to set up a connection, such as an IP connection, with the IM login server 16 for the mobile subscriber 12 and for facilitating information flow between the IM login server 16 and the mobile subscriber 12 once the connection is established. The IM proxy 24 is preferably a UNIX or NT server, and is preferably associated with a wireless circuit switched mobile network represented generally at 26. More specifically, the IM proxy 24 is preferably housed within a mobile services switching center (MSC) 28. Alternatively, the IM proxy 24 may be located in proximity to the MSC 28, or housed in, or located in proximity to, a base station, a base station controller, a GSN regional network controller, a packet data system controller (GSM SGSN), or a packet data gateway (GSM GGSN or CDMA 2000 PDSN), all of which are known mobile network entities.

Figure 2:
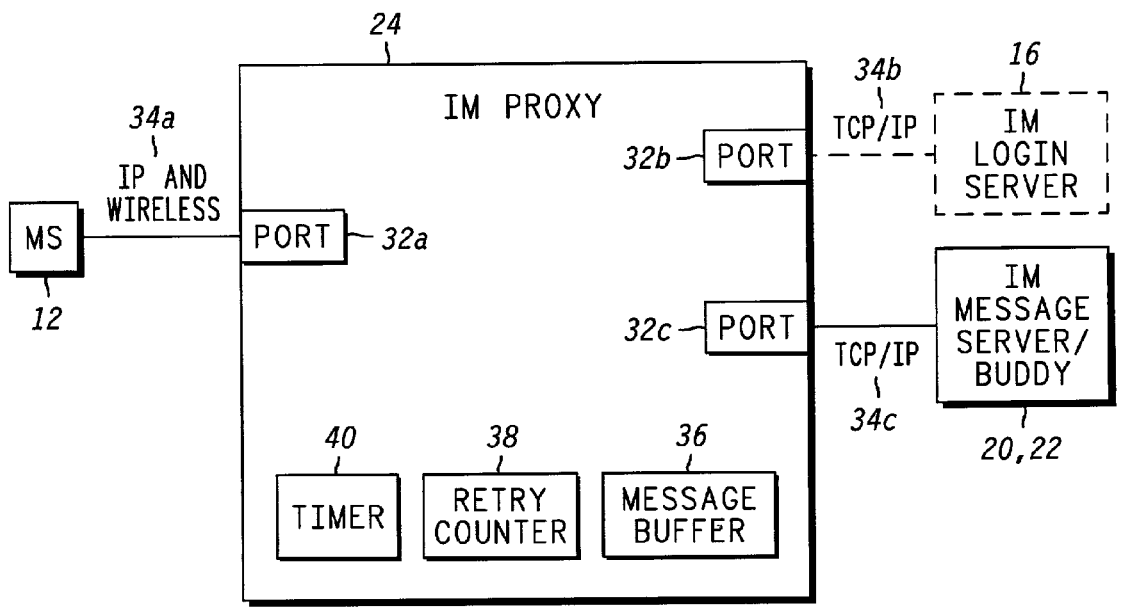
FIG. 2 is a more detailed block diagram of the IM proxy shown in FIG. 1.

FIG. 2 shows the IM proxy 24 in more detail. The IM proxy 24 includes multiple ports, such as ports 32a–32c, for establishing an IP connection 34a with the mobile subscriber 12 and IP (TCP or UDP) connections 34b, 34c with the IM login server 16 and the IM servers 20, 22. A message buffer 36 stores instant messages intended for the mobile subscriber 12 based on IM system parameters discussed below. A retry counter 38 and a timer 40 enable the IM proxy 24 to maintain its IP connection with the IM login server 16, and therefore maintain the mobile subscriber's registered status with the IM login server 16, when the mobile subscriber 12 becomes temporarily unavailable due to roaming or the like, by causing the IM proxy 24 to re-send a message intended for the mobile subscriber 12 a predetermined number of times within a predetermined time period before the IM proxy 24 drops the message from the message buffer 36. The number of times that a message is re-sent and the time period within which the message is resent are parameters that may be programmed into the IM proxy 24 based on system or subscriber requirements. Through utilization of the retry counter 38 and/or the timer 40, the IM proxy 24 minimizes the number of times that instant messages intended for the mobile subscriber 12 are dropped when the mobile subscriber 12 temporarily roams outside a designated mobile coverage area or otherwise temporarily becomes unavailable from the standpoint of the IM login server 16. The reader will note that the word "connection" as used in TCP Systems does not have the same meaning in UDP system. As used here 'connections' mean some way for two entities to exchange messages.

Figure 3:
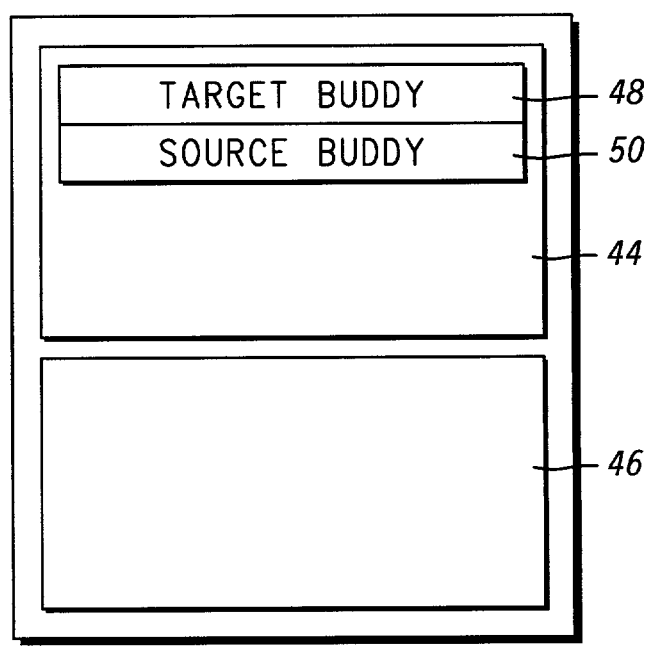
FIG. 3 is a block diagram of the components of an IM message packet of the type sent over the system shown in FIG. 1.

FIG. 3 illustrates the basic structure of an instant message 42 of the type that is transmitted across the IM system 10. The instant message structure is similar to that of an email message and includes both a message header 44 and a message body 46. The header 44 includes both target buddy "To" and source buddy "From" subheaders 48, 50. The target buddy subheader 48 contains information that identifies a subscriber who is intended to receive the instant message 48, while the source buddy subheader 50 contains information that identifies an IM subscriber who is sending the instant message. The header 44 may also contain other information such as timestamp and subject information. The message body 46 contains the actual message that is to be communicated to the target buddy. As will now be described, the IM proxy 24 efficiently utilizes the information in the target buddy and source buddy subheaders 48, 50 to manage IM sessions between a mobile subscriber, such as the mobile subscriber 12, and buddies of the mobile subscriber, and in a manner that minimizes the occurrence of instant messages intended for the mobile subscriber being dropped.

Referring now to the timing diagrams shown in FIGS. 4–6, operation of the IM proxy 24 within the IM system 10 will now be discussed. Although only the mobile subscriber (target buddy) 12 and the conventional subscriber (source buddy) 14 are shown as being registered with the IM login server 16 (FIG. 1) and as communicating with the IM proxy 24, it should be understood that multiple source buddies (either mobile or conventional subscribers) are capable of communicating with multiple target buddies (either mobile or conventional subscribers) via the functionality implemented at the IM proxy 24.

Figure 4:
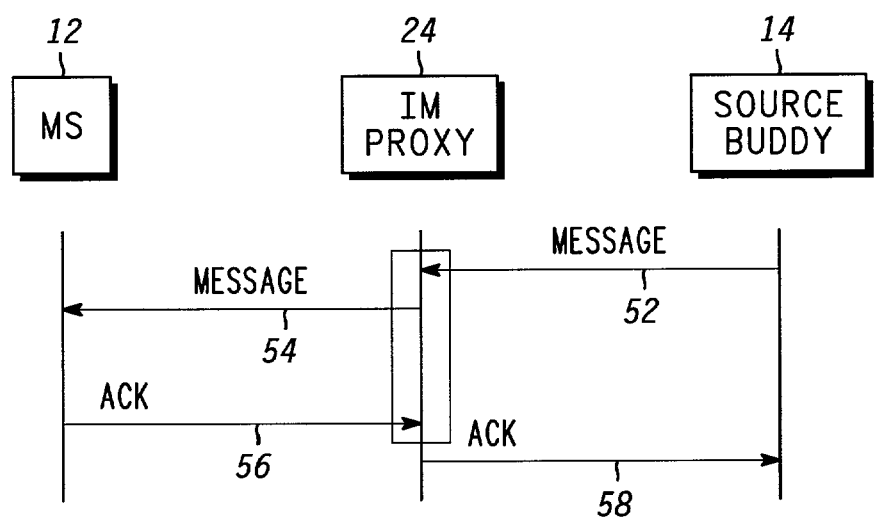
FIG. 4 is a timing diagram illustrating an IM session setup between a source buddy and a target buddy in the system shown in FIG. 1.

Specifically, FIG. 4 illustrates a situation in which the mobile subscriber 12 is available for receiving instant messages from the conventional subscriber 14. Initially, at 52 the conventional subscriber 14 transmits an instant message intended for the mobile subscriber 12 after receiving an indication from the IM proxy 24 that the mobile subscriber 12 is logged on to the IM system 10 and is therefore available to participate in an IM session. The target buddy subheader 48 of the instant message identifies the mobile subscriber 12 as the target buddy, while the source buddy subheader 50 identifies the conventional subscriber 14 as the source buddy. The instant message is first delivered 52 to the IM proxy 24 and then at 54 is forwarded to the mobile subscriber 12. Because the mobile subscriber 12 is registered and online when the instant message is forwarded from the IM proxy 24, the mobile subscriber 12 receives the message in real time and at 56 acknowledges receipt of the message by sending an Ack message back to the conventional subscriber 14. The IM proxy 24 receives the Ack message and then forwards it at 58 to the conventional subscriber 14 as confirmation that the mobile subscriber 12 received the message sent at 52.

Figure 5:
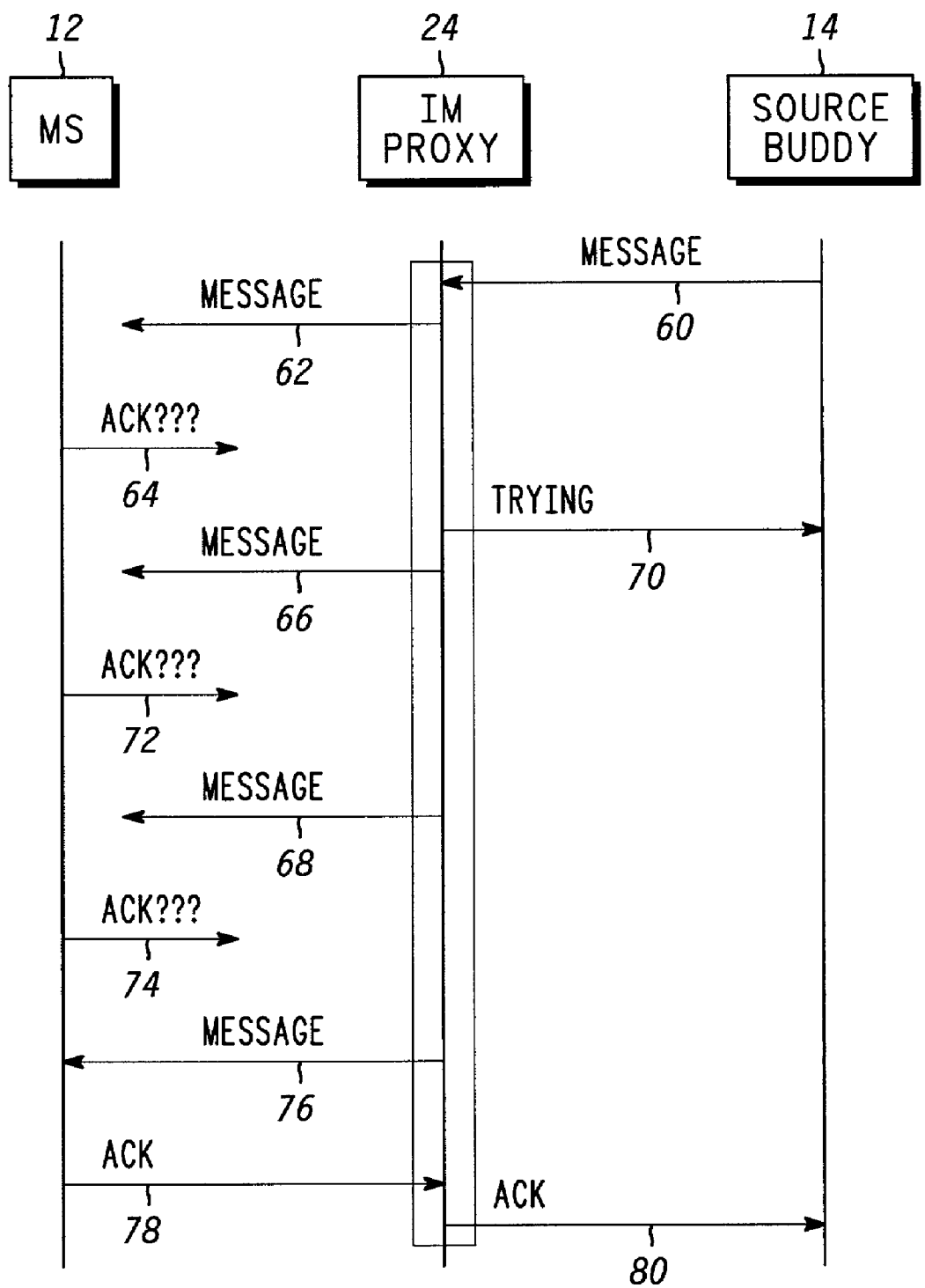
FIG. 5 is a timing diagram illustrating message transmission protocol between the source and target buddies shown in FIG. 4.

FIG. 5 illustrates a situation in which the mobile subscriber 12 temporarily travels outside the coverage area of the mobile network 26. At 60, the conventional subscriber 14 transmits an instant message to the mobile subscriber 12 after learning via the IM proxy 24 that the mobile subscriber 12 is logged on to the IM system 10 and therefore available to participate in an IM session. The instant message is first delivered to the IM proxy 24 and then at 62 the IM proxy 24 attempts to deliver the message to the mobile subscriber 12. However, if the mobile subscriber 12 temporarily loses coverage and is therefore unavailable to receive the message sent at 60, it does not receive the message and therefore, as indicated at 64, does not reply with an Ack message. Subsequently, the IM proxy 24 increments the retry counter 38 and starts the timer 40 before again attempting to send the message, as indicated at 66 and 68, as long as the number of retries has not exceeded a predetermined limit tracked by and programmed into the retry counter 38 and as long as the predetermined time period tracked by the timer 40 has not expired. The number of retries, the delay between delivery attempts, and the predetermined time period are parameters that are preferably based on system latency characteristics, such as network reliability, network location, the load on the proxy, the time of day, and the identity of the source or target buddy. However, these parameters may also be determined based on individual service options paid for by each subscriber, subscriber classes, subscriber usage habits, and the like.

Once the retry counter 38 and the timer 40 are enabled, the IM proxy 24 periodically informs the conventional subscriber 14 that, as indicated at 70, it is in the process of trying to deliver the message. However, the mobile subscriber will continue to fail to reply with an Ack message, as indicated at 72 and 74, as long as the mobile subscriber 12 remains outside of the mobile network coverage area.

If the mobile subscriber re-enters the mobile network coverage area before the number of retries exceeds the predetermined limit tracked by and programmed into the retry counter 38 and before the predetermined time period tracked by the timer 40 expires, the IM proxy 24 stops and resets the retry counter 38 and the timer 40. Upon finally receiving the instant message at 76, the mobile subscriber 12 responds by sending an Ack message at 78 back to the conventional subscriber 14. The IM proxy 24 receives the Ack message from the mobile subscriber 12 and at 80 forwards it to the conventional subscriber 14 as confirmation that the mobile subscriber 12 received the instant message. The IM proxy 24 then stops and resets the retry counter 38 and the timer 40.

While the above operation of the IM proxy 24 has been described with respect to an IM session between a mobile subscriber and a conventional subscriber, it should be appreciated that the message protocol of the IM proxy is capable of being implemented for IM sessions between two or more mobile subscribers as well as IM sessions between two or more mobile subscribers and two or more conventional subscribers. For IM sessions in which there are three or more participants, the retry counter 38 and the timer 40 are capable of tracking multiple attempted message deliveries to multiple mobile subscribers. Alternatively, there may be multiple instantiations of the IM proxy within the IM system; namely, one IM proxy per mobile station. Also, it should be appreciated that the proxy 24 can be implemented with only a counter when the number of retries is limited, or with only a timer when the proxy is designed to retry an unlimited number of times until the timer expires.

Figure 6:
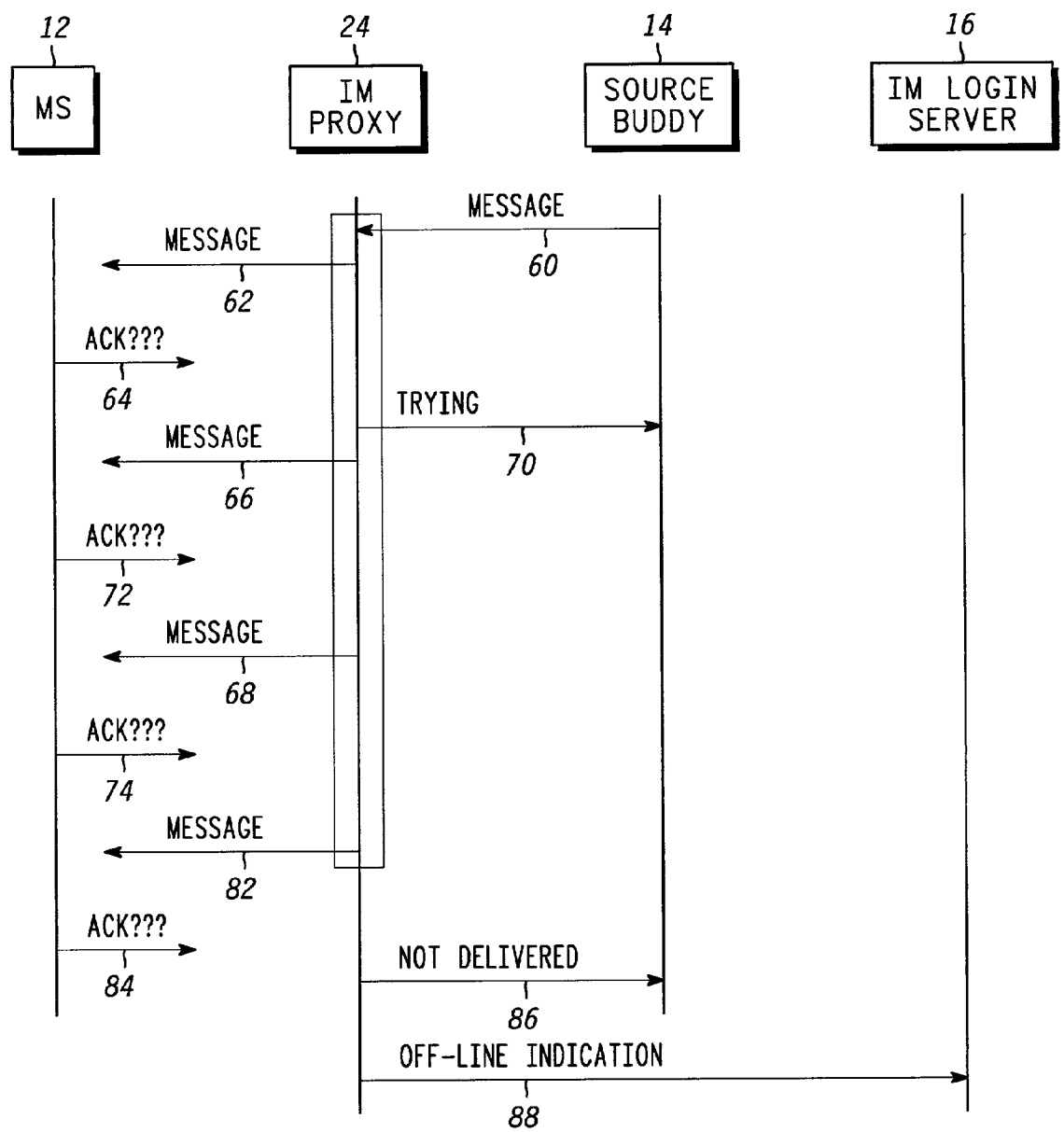
FIG. 6 is a timing diagram illustrating further message transmission protocol between the source and target buddies shown in FIG. 4.

FIG. 6 illustrates a situation in which the mobile subscriber 12 becomes unavailable for receiving instant messages for a period of time that exceeds the number of retries allotted by and programmed into the retry counter and/or the predetermined time period allotted by the timer 40. The sequence of messaging events 60–74 are identical to those discussed in connection with FIG. 5. However, the message events 82, 84 differ from the message events 76, 78. Specifically, if the mobile subscriber 12 fails to re-enter the mobile network coverage area and therefore remains incapable of receiving the instant message from the conventional subscriber 14, the IM proxy 24 again unsuccessfully re-tries at 82 to forward the message to the mobile subscriber 12. The mobile subscriber 12 does not receive the message and, as indicated at 84, therefore does not send an Ack message back to the conventional subscriber 14.

Subsequent to the IM proxy 24 re-trying to send the message at 82, the number of times that the IM proxy tries to send the message exceeds the predetermined limit allotted by and programmed into the retry counter 38 and/or the predetermined time period allotted by the timer 40 expires. As a result, the IM proxy 24 discontinues its attempts to forward the message to the mobile subscriber 12 and drops the message. At 86 it sends a delivery failure indication to the conventional subscriber 14. Preferably the delivery failure indication will be formatted to appear as though it is sent from the mobile subscriber 12 and to explain that the mobile subscriber 12 is connected via the wireless network 28. Once the delivery failure indication is delivered at 86, the IM proxy 24 then drops the connection between it and the conventional subscriber 14. In addition, at 88 the IM proxy 24 also drops its connection with the IM login server 16 after indicating to the IM server 16 that the mobile subscriber 12 is unavailable. Dropping this connection can take numerous forms depending on the underlying transport system. In a TCP system the handshake is discontinued. In UDP systems, a message explicably indicating unavailability, explicit de-registration, or perhaps allowing the expiration of a registration timer can be used.

In view of the above, it should now be appreciated that the IM proxy 24 of the instant message system of the present invention is capable of maintaining a mobile subscriber's availability status. Therefore, the mobile subscriber continues to appear available to IM buddies when the mobile subscriber is roaming or temporarily out of service even after the IM proxy unsuccessfully attempts to send an instant message to the mobile subscriber. Messages will continue to be re-sent to the mobile subscriber in the near-real time manner characteristic of a typical instant message system until IM parameters programmed into the retry counter 38 and/or the timer 40 are exceeded and the IM proxy drops the message.

Turning now to FIGS. 7 and 8, the functionality of the IM proxy 24 will now be described according to another embodiment of the present invention. It should be understood that the underlying IM system of the embodiment discussed in connection with FIGS. 7 and 8 is substantially identical to that shown in FIGS. 1–3 except for those components labeled with different reference numerals.

Specifically, FIG. 7 illustrates an IM session between the mobile subscriber 12 and the conventional subscriber 14 in which the IM proxy 24' bundles instant messages sent to the mobile subscriber 12 based on certain predetermined parameters discussed below. After both the mobile subscriber 12 and the conventional subscriber 14 come online and register with the IM server 16 (FIG. 1), the mobile subscriber 12 sends a message via the IM proxy at 90 to the conventional subscriber 14. The IM server 20 receives the message and then forwards the message at 92 to the conventional subscriber 14 based on information contained in the target buddy subheader 48 (FIG. 3).

After receiving the message, the conventional subscriber 14 responds by sending a message at 94 back to the mobile subscriber 12 through the IM server 20 and the IM proxy 24'. However, the IM proxy 24' recognizes, via information contained in the target buddy subheader 48 (FIG. 3), that the message is intended for the mobile subscriber 12. To minimize connection overhead in the circuit switched mobile network 28, the IM proxy 24' does not maintain an open connection with the mobile subscriber 12. Specifically, the IM proxy 24' registers with the IM server 16 (FIG. 1) on behalf of the mobile subscriber 12 and provides availability information to mobile subscriber buddies such as the conventional subscriber 14. However, it does not maintain a constant connection with the mobile subscriber 12, but instead bundles instant messages for the mobile subscriber 12 and notifies the mobile subscriber 12 that instant messages are available for download from the message buffer 36 (FIG. 2) only when the mobile subscriber 12 has multiple messages stored in the message buffer 36 or, alternatively, only after at least one instant message has been stored in the message buffer 36 for a certain amount of time. Alternatively, the proxy 24' may notify the mobile subscriber 12 by sending the instant messages from the message buffer 36 to the mobile subscriber 12. Therefore, in the current example, the IM proxy 24' stores the instant message forwarded at 96 from the IM server 20 until the above discussed, or other system-specific, downlink parameters are met.

In the meantime, the mobile subscriber 12 may send an additional message at 98 to the conventional subscriber 14 asking whether the conventional subscriber 14 received the message sent at 90. After receiving the message, the conventional subscriber 14 again responds by sending a message at 102 back to the mobile subscriber 12 through the IM server 20. However, the IM proxy 24' again recognizes, via information contained in the target buddy subheader 48 (FIG. 3), that the message is intended for the mobile subscriber 12, and therefore stores the instant message in the message buffer 36 until a downlink is established with the mobile subscriber 12.

As indicated by the message sequences shown at 106–112, this cycle may be repeated until the IM proxy 24' determines that it is time to forward all stored instant messages to the mobile subscriber 12. If, for example, the IM proxy 24' is programmed to forward instant messages to the mobile subscriber 12 when the number of stored instant messages reaches 3, the IM proxy 14 will establish a downlink connection with the mobile subscriber 12 and, as indicated at 114, will forward the three stored messages to the mobile subscriber 12. Therefore, even though some latency is introduced into the IM system, overall system connection overhead is reduced.

FIG. 8 illustrates an IM session involving the mobile subscriber 12 and multiple buddies, such as conventional subscribers 14, 14' and 14", in which the IM proxy 24' stores and bundles instant messages in its buffer 36 from the conventional subscribers 14, 14' and 14" based on predetermined participant parameters to minimize system connection overhead in a manner that also minimizes the amount of latency introduced into the system due to the message bundling.

For example, after the conventional subscribers 14, 14' and 14" come online and register with the IM login server 16 (FIG. 1), each of the conventional subscribers 14, 14' and 14" sends a message to the mobile subscriber 12 through the IM server 20 and the IM proxy 24'. The IM proxy 24' recognizes, via information contained in the target buddy subheader 48 (FIG. 3) of each of the messages, that the messages sent at 116–120 are intended for the mobile subscriber 12. The IM proxy 24' then stores and bundles these messages in its message buffer 36 until the IM proxy 24' determines, in a manner that will be discussed in connection with FIG. 9, that the messages should be downloaded to the mobile subscriber 12. When the IM proxy 24' determines that download parameters have been met, the IM proxy 24' establishes a connection with the mobile subscriber 12 and at 122 downloads the stored and bundled messages to the mobile subscriber 12.

FIG. 9 illustrates an exemplary IM session between the mobile subscriber 12 and multiple buddies, such as conventional subscribers 14, 14' and 14", in which the IM proxy 24' monitors the number of participants in an IM session, the message rate and the number of stored messages in its buffer from each participant, and bundles instant messages sent to the mobile subscriber 12 based on certain predetermined participant parameters discussed below to minimize system connection overhead in a manner that also minimizes the amount of latency introduced into the system due to the message bundling.

After both the mobile subscriber 12 and the conventional subscribers 14, 14' and 14" come online and register with the IM server 16 (FIG. 1) through respective connections, the mobile subscriber sends a message at 124 through the IM proxy 24' and the IM server 20 as discussed above to the conventional subscriber 14. After receiving the message, the conventional subscriber 14 responds by sending a message at 126 back to the mobile subscriber 12. The IM proxy 24' recognizes, via information contained in the target buddy subheader 48 (FIG. 3), that the message sent at 126 is intended for the mobile subscriber 12. However, the IM proxy 24' recognizes that the message sent at 126 is from the source buddy for which it had recently received the message sent at 124. The IM session between the mobile subscriber 12 and the conventional subscriber 14 continues in this manner, as exemplified by subsequent messages sent at 128, 130, until the IM proxy 24' is notified by the IM server 20 that additional buddies, such as conventional subscribers 14', 14", have registered with the IM server 20 as indicated generally at 132, 134. As indicated at 136, the IM proxy 24' continues to forward messages to the mobile subscriber 12 as long as the IM proxy 24' continues to detect only messages from a single IM session participant. The IM proxy 24' begins to bundle instant messages intended for the mobile subscriber in the buffer 36 when the IM proxy 24' detects that multiple participants are sending messages, such as those shown at 138–142, to the mobile subscriber 12. The IM proxy 24' then establishes a connection with the mobile subscriber 12 and flushes the IM proxy buffer 36 when a predetermined bundling parameter is met, such as when one of the IM session participants, such as the conventional subscriber 14", sends a second message, such as the message at 144, while a previous message sent from that participant at 138 is being stored in the buffer 36.

In the present example, the IM proxy 24' forwards the stored instant messages at 146 after it receives the second message at 144 from the conventional subscriber 14". However, the IM proxy 24' can be programmed to cease instant message bundling based on: a predetermined number of IM session participants sending messages to the target buddy within a predetermined time period; more than a predetermined number of IM session participants sending more than a predetermined number of messages to the target buddy within a predetermined time period; an IM session participant sending a second message to the mobile subscriber during message bundling while a previous message sent by the participant is being stored at the IM proxy; more than a predetermined number of messages are stored; a predetermined storage time is exceeded; a predetermined buffer memory threshold is exceeded; the number of IM session participants; call traffic on the wireless system; mobile subscriber subscription parameters; a request or instructions from the mobile subscriber to initiate message bundling; and/or a subsequent connection made by the mobile subscriber for purposes other than the particular IM session.

Of course, the IM proxy 24' can also be programmed to initiate message bundling operations when one or more of the above parameters is/are no longer met, or when, for example, the mobile subscriber 12 informs the IM proxy 24' that the mobile subscriber no longer wants message bundling.

It should therefore be understood based on the above discussion in connection with FIGS. 8 and 9 that the IM proxy 24' of the present invention can be programmed to provide message bundling to minimize mobile system overhead connection costs and at the same time minimize IM system latency.

While the above description is of the preferred embodiment of the present invention, it should be appreciated that the invention may be modified, altered, or varied without deviating from the scope and fair meaning of the following claims.

What is claimed is:

1. A method of bundling messages for a mobile subscriber in an instant message system to minimize mobile system connection overhead, comprising:

queuing instant messages intended for the mobile subscriber in a message buffer while the mobile subscriber is not registered with the instant message system;

notifying the mobile subscriber that instant messages are available for download from the message buffer only when the mobile subscriber has multiple messages stored in the message buffer to minimize connection overhead in the network; and facilitating connection of the mobile subscriber to the instant message system to enable the mobile subscriber to retrieve the queued instant messages.

2. The method of claim 1, wherein the notifying the mobile subscriber comprises notifying the mobile subscriber when a number of queued instant messages intended for the mobile subscriber reaches a predetermined number.

3. The method of claim 1, wherein the notifying the mobile subscriber comprises notifying the mobile subscriber when at least one queued instant message intended for the mobile subscriber has been queued for a predetermined amount of time.

4. The method of claim 3, wherein the notifying the mobile subscriber when queued instant message parameters reach a predetermined limit comprises notifying the mobile subscriber when a predetermined number of buddies send messages intended for the mobile subscriber within a predetermined amount of time.

5. The method of claim 1, wherein the notifying the mobile subscriber comprises notifying the mobile subscriber when a predetermined number of buddies send a predetermined number of messages intended for the mobile subscriber within a predetermined amount of time.

6. The method of claim 1, wherein the notifying the mobile subscriber is based at least in part on a number of instant message session participants.

7. The method of claim 1, wherein the notifying the mobile subscriber is based at least in part on one of mobile network traffic parameters and mobile subscriber subscription parameters.

8. The method of claim 1, further comprising:
  causing the mobile subscriber to register with the instant message system when the mobile subscriber wants to participate in an instant message session; and
  indicating to buddies of the mobile subscriber that the mobile subscriber is available for receiving instant messages.

9. The method of claim 1, further comprising downloading the queued instant messages intended for the mobile subscriber when one of a high priority instant message is received and the mobile subscriber sends an outgoing message.

10. The method of claim 1, further comprising notifying buddies of the mobile subscriber that the mobile subscriber is connected through a wireless system upon initiation of the queuing of instant messages intended for the mobile subscriber while the mobile subscriber is not registered with the instant message system.

11. A mobile subscriber instant message system, comprising:
  an instant message proxy located between a mobile subscriber and at least one instant message buddy of the mobile subscriber for queuing instant messages intended for the mobile subscriber while the mobile subscriber is not registered;
  the instant message proxy further for notifying the mobile subscriber that instant messages are available for download from the message buffer only when the mobile subscriber has multiple messages stored in the message buffer to minimize connection overhead in the network; and
  the instant message proxy further for enabling the mobile subscriber to retrieve the queued instant messages when the queued instant message parameters reach the predetermined limit.

\* \* \* \* \*